(12) United States Patent
Cheluget et al.

(10) Patent No.: US 8,431,096 B2
(45) Date of Patent: *Apr. 30, 2013

(54) PROCESS FOR HIGH TEMPERATURE SOLUTION POLYMERIZATION

(75) Inventors: Eric Cheluget, Calgary (CA); Arun Sood, Calgary (CA)

(73) Assignee: Nova Chemicals (International) S.A (CH)

( * ) Notice: Subject to any disclaimer, the term of this patent is extended or adjusted under 35 U.S.C. 154(b) by 183 days.

This patent is subject to a terminal disclaimer.

(21) Appl. No.: 12/931,939

(22) Filed: Feb. 15, 2011

(65) Prior Publication Data

US 2011/0144254 A1    Jun. 16, 2011

Related U.S. Application Data

(63) Continuation-in-part of application No. 12/229,062, filed on Aug. 19, 2008, now Pat. No. 7,919,568.

(30) Foreign Application Priority Data

Aug. 27, 2007   (CA) ..................................... 2598957

(51) Int. Cl.
   *C08F 2/08*   (2006.01)
   *C08F 2/06*   (2006.01)
   *B01J 19/00*   (2006.01)

(52) U.S. Cl.
   USPC ............. 422/610; 422/134; 422/168; 526/66; 526/74

(58) Field of Classification Search ............... 526/74, 526/66; 422/134, 168, 610; 528/503; 523/324
   See application file for complete search history.

(56) References Cited

U.S. PATENT DOCUMENTS

| | | |
|---|---|---|
| 3,553,156 A | 1/1971 | Anolick et al. |
| 3,726,843 A | 4/1973 | Anolick et al. |
| 4,105,609 A | 8/1978 | Machon et al. |
| 4,379,882 A | 4/1983 | Miyata |
| 4,444,922 A | 4/1984 | Gutowski et al. |
| 4,547,473 A | 10/1985 | Hamilton et al. |
| 4,731,438 A | 3/1988 | Bernier |
| 4,803,259 A | 2/1989 | Zboril et al. |
| 4,857,633 A | 8/1989 | Irani et al. |
| 5,132,380 A | 7/1992 | Stevens et al. |
| 5,198,401 A | 3/1993 | Turner et al. |
| 5,589,555 A | 12/1996 | Zboril et al. |
| 5,599,885 A | 2/1997 | Kawasaki et al. |
| 5,691,445 A | 11/1997 | Krupinski et al. |
| 5,708,133 A | 1/1998 | Higuchi et al. |
| 6,180,730 B1 | 1/2001 | Sibtain et al. |
| 6,777,509 B2 | 8/2004 | Brown et al. |
| 6,881,800 B2 | 4/2005 | Friedersdorf |
| 7,163,989 B2 | 1/2007 | Friedersdorf |
| 7,199,163 B2 * | 4/2007 | Bigiavi et al. ................. 528/480 |
| 7,332,070 B2 | 2/2008 | Nishida et al. |
| 7,919,568 B2 * | 4/2011 | Cheluget et al. ................. 526/74 |
| 2008/0153996 A1 | 6/2008 | Friedersdorf et al. |

FOREIGN PATENT DOCUMENTS

| | | |
|---|---|---|
| EP | 0 418 044 A2 | 3/1991 |
| WO | WO 98/02471 A1 | 1/1998 |
| WO | WO 99/41294 A1 | 8/1999 |

* cited by examiner

*Primary Examiner* — Tae H Yoon
(74) *Attorney, Agent, or Firm* — Kenneth H Johnson (57) ABSTRACT

The current invention provides a method of improving the efficiency of one or more heat exchangers used in cooperation with a high temperature solution polymerization process. Addition of surface active agents, such as $C_6$ to $C_{22}$ carboxylic acids, to a two phase liquid-liquid polymer solution downstream of a reactor system and upstream of a heat exchanger system can increase the efficiency of heat exchange by more than 10 %.

28 Claims, 2 Drawing Sheets

PROCESS FOR HIGH TEMPERATURE SOLUTION POLYMERIZATION

CROSS REFERENCE TO RELATED PATENT APPLICATION

This application is a continuation-in-part of U.S. Ser. No. 12/229,062, filed Aug. 19, 2008, which is now U.S. Pat. No. 7,919,568 issued Apr. 5, 2011, which claims priority to and the benefit of Canadian Application No. 2,598,957, filed Aug. 27, 2007.

FIELD OF THE INVENTION

This invention relates to the area of high temperature solution polymerization, more specifically to a polymerization process in which the efficiency of an associated heat exchanger system is increased.

BACKGROUND OF THE INVENTION

Solution polymerization processes are carried out at temperatures that are above the melting point of the product polymer. In a typical process, catalyst components, solvent, polymerizable monomers and hydrogen are fed under pressure to one or more stirred tank reactors. Catalyst components may be fed to the reactor as a solution or as a slurry and the temperature of the reactor is controlled by the rate of catalyst addition, the temperature of the catalyst feed stream and/or the use of heat transfer systems. Typical polymerizable monomers for solution phase polymerization processes include ethylene, styrene, propylene and various dienes.

For ethylene polymerization, reactor temperatures can range from about 130° C. to about 250° C. while pressures are generally in the range of from about 500 to about 4000 psi. Although catalyst residence times are generally short (e.g. minutes) due to the harsh reactor conditions, if desired, solution polymerization may be operated under a wide range of process conditions that allow tailoring of the product polymer as well as rapid product swings.

In solution polymerization, product polymer is molten and remains dissolved in the solvent under reactor conditions, forming a polymer solution. After a selected hold-up time (i.e. catalyst residence time), the polymer solution leaves the reactor as an effluent stream and the polymerization reaction is quenched, typically with coordinating polar compounds, to prevent further polymerization. Once quenched, the polymer solution is typically fed to a flash devolatilization system for solvent removal. Flash devolatilization also removes un-reacted monomers from the polymer solution.

Under certain conditions of temperature and pressure, the polymer solution can phase separate into two distinct liquid phases, one which is "lean" in dissolved polymer and one which is "rich" in dissolved polymer. Phase separation occurs at the lower critical solution temperature (LCST), also known as the "cloud point". Increasing the temperature, or decreasing the pressure at the cloud point leads to further phase separation. The cloud point is determined in part by the pressure, temperature, solution composition and the solvent used for polymerization.

It is generally undesirable to have phase separation occur within the polymerization reactor, and process conditions such as monomer concentration, temperature and pressure are controlled to avoid liquid-liquid phase separation. For example, the polymerization temperature may be kept between the crystallization boundary and the LCST of the polymer solution for a given pressure, solvent and monomer concentration. However, once the polymer solution leaves the reactor, it may be beneficial to promote liquid-liquid phase separation as it can facilitate separation of volatile components from the polymer product.

U.S. Pat. Nos. 3,553,156 and 3,726,843 assigned to du Pont de Nemours describes a process in which the reactor effluent, an elastomeric ethylene copolymer solution, is induced to undergo a liquid-liquid phase separation into "polymer rich" and "polymer lean" fractions through the release of pressure by use of a pressure let down valve. The two liquid phases are decanted from one another in a settlement chamber and the polymer rich phase is fed into a low-pressure separator to boil off residual solvent and un-reacted monomer. The polymer lean phase is recycled to the reactor. The process substantially reduces the energy lost by evaporation of volatiles (i.e. the heat of vaporization) in a devolatilization chamber by separating out the volatiles in a "polymer lean" liquid phase.

In U.S. Pat. No. 4,857,633 assigned to Exxon Research & Engineering, a high temperature solution process is described in which a low molecular weight hydrocarbon is added to a polymer solution to facilitate phase separation of a polymer solution under certain conditions of temperature and pressure.

U.S. Pat. No. 6,881,800 assigned to ExxonMobil, discloses a process and apparatus to separate a polymer solution into polymer rich and polymer lean liquid phases prior to devolatilization. The apparatus includes a pressure source, a polymerization reactor, a pressure let down device, and a separator downstream of one another respectively. In the process, the high pressure source is used to maintain a single liquid phase in the polymerization reactor, while the pressure let-down device facilitates the formation of a two-phase liquid-liquid system having a polymer rich phase and a polymer lean phase. Separation of these phases is accomplished by way of a liquid phase separator that feeds the polymer rich phase to a chamber at lower pressure in order to flash off residual solvent and un-reacted monomer.

Similarly, U.S. Pat. No. 5,599,885 assigned to Mitsui Petrochemicals, describes a solution polymerization process in which phase separation downstream of the reactor is used to facilitate polymer isolation. The reactor effluent is separated into a lower phase that is rich in polymer and an upper phase that is rich in solvent by increasing the temperature of the polymer solution within a "separation zone". The temperature is raised to more than 180° C. above the upper cloud point temperature of the polymer solution. Polymer is recovered from the lower phase, while the upper phase is in part recycled to the reactor.

In U.S. Pat. No. 4,444,922, an improved phase separation process is described. Temperatures and pressures are moderated to produce "spinodal decomposition" driven phase separation as opposed to "nucleation and growth" driven phase separation. Spinodal decomposition driven phase separation is a form of phase separation that promotes rapid partitioning and settling of the polymer lean and polymer rich phases. The process facilitates separation of the distinct liquid phases by way of a liquid-liquid separator or a decanter.

In a typical devolatilization process, the polymer solution (reactor effluent) is pre-heated in a heat exchanger and then passed into a chamber of reduced pressure. Boiling of solvent and un-reacted monomers occurs and the vapors are sent to a solvent and monomer recovery system and are recycled back to the reactor. Heating the polymer solution upstream of the devolatilization system increases the enthalpy of the product stream, providing high temperatures to the polymer melt after devolatilization. The high temperatures facilitate flow of the polymer melt by reducing its viscosity. The heat exchangers used are most commonly shell and tube type heat exchangers and can increase the temperature of the polymer solution to as high as about 280° C.

U.S. Pat. No. 4,547,473 describes a typical high temperature solution process for the homo- or co-polymerization of ethylene at temperatures in excess of 150° C. using a titanium based catalyst system. Solvent is removed using standard flash devolatilization as described in U.S. Pat. No. 5,708,133.

In PCT application, 98/02471 filed by Dow Chemicals, a solution polymerization process is described in which a two stage devolatilization system is used to remove solvent and un-reacted monomers from an EPDM (ethylene-propylene-diene monomer) polymer solution. In a preferred embodiment a dual reactor system is used in which the temperature of the second reactor is between 90° C. and 120° C. For flash devolatilization, the temperature of the reactor effluent is raised to between 210° C. and 250° C. by passage through a heat exchanger prior to entering the flash chamber that is at lower pressure.

U.S. Pat. No. 5,691,445 assigned to Novacor Chemicals describes a polymer solution devolatilization process in which less than 150 ppm of residual volatiles is retained in the isolated polymer. In the process, the polymer solution leaves the polymerization reactor and travels through a pre-heat exchanger. The pre-heat exchanger heats the polymer solution to temperatures from about 200° C. to 270° C. to increase the vapor pressure of volatiles and to reduce the polymer solution viscosity. In a preferred embodiment, a super-critical fluid is added to the process at a point between the first and second devolatilization chambers to enhance polymer melt foaming.

The efficiency of a heat exchanger is a major consideration when determining the volume of polymer solution that may be adequately heated by a given heat transfer fluid. The overall amount of heat transfer depends on a number of factors, including but not limited to the materials used for construction of a heat exchanger, the area of the heat exchange surface (i.e. the number, length and diameter of tubes in the tube sheet of a shell and tube type heat exchanger), the rate of flow of polymer solution and/or the heat transfer fluid through the tube and shell sides of the heat exchanger respectively, whether the flows are parallel counter-current or parallel co-terminus, the nature of fluid flow (turbulent or Newtonian), and the nature and composition of the exchanging fluids.

Optimization of heat transfer is most commonly addressed though the design and construction of the associated heat exchanger equipment. As a result, significant capital investment may be required for making suitable upgrades such as the installation of inserts to increase turbulent flow within the heat exchanger tubes, the use of larger heat exchangers or the use of heat exchangers with more heat exchange capacity. Alternatively, the heat transfer fluid may be heated to higher temperatures, but this requires significantly higher energy input.

There remains a need for improving the efficiency of heat transfer within the one or more heat exchangers, associated with a solution polymerization process, without requiring large capital investments or increased operating costs.

SUMMARY OF THE INVENTION

The invention provides a practical low cost method of enhancing the heat exchange capacity of a heat exchanger system used in a high temperature solution polymerization process.

The current invention provides an improved process for solution polymerization in which surface active agents are added to a two phase liquid-liquid polymer solution to improve the efficiency of heat transfer in the associated heat exchanger system.

In an embodiment of the invention, the heat exchanger system comprises one or more shell and tube type heat exchangers.

The process of the invention allows for higher flow rates of polymer solution through a heat exchanger system and mitigates the requirement for higher energy requirements or costly and time consuming upgrades to a heat exchanger.

The present invention provides an improved high temperature solution polymerization process, the improvement of which comprises increasing the heat transfer coefficient, U, of at least one heat exchanger by: (a) inducing a single phase polymer solution to undergo phase separation into a polymer lean phase and a polymer rich phase; and (b) adding a surface active agent compound.

The present invention provides a high temperature solution polymerization process comprising:

(a) polymerizing one or more than one olefin in a solvent within a reactor system to produce a single phase polymer solution;

(b) quenching the polymerization reaction downstream of the reactor system with a catalyst deactivator;

(c) reducing the pressure of the single phase polymer solution downstream of the reactor system to a pressure which induces the single phase polymer solution to undergo liquid-liquid phase separation into a two phase polymer solution; and (d) feeding the two phase polymer solution through a heat exchanger system, wherein the heat transfer coefficient, U, of at least one heat exchanger is increased by adding at least one surface active agent to the polymer solution downstream of the reactor system and upstream of the heat exchanger system.

The present invention provides a high temperature solution polymerization process comprising:

(a) polymerizing ethylene and optionally an alpha olefin in a solvent within a reactor system to produce a single phase polymer solution;

(b) quenching the polymerization reaction downstream of the reactor system with a catalyst deactivator;

(c) reducing the pressure of the single phase polymer solution downstream of the reactor system to a pressure which induces the single phase polymer solution to undergo liquid-liquid phase separation into a two phase polymer solution;

(d) feeding the two phase polymer solution through a heat exchanger system comprising at least one heat exchanger, wherein the heat transfer coefficient U, of at least one heat exchanger is increased by adding at least one surface active agent to the polymer solution downstream of the reactor system and upstream of the heat exchanger system; and (e) feeding the polymer solution effluent from the heat exchanger system directly to a flash devolatilization system.

In an embodiment of the invention, the surface active agent in (d) is also the catalyst deactivator in (b), and the surface active agent is added in an amount higher than the amount of surface active agent required to quench the polymerization reaction.

In an embodiment of the invention a surface active agent and a catalyst deactivator are the same compound, and the surface active agent is added in an amount higher than the amount of surface active agent required to quench the polymerization reaction.

The invention also provides, a high temperature solution polymerization process comprising:

(a) polymerizing ethylene and optionally an alpha-olefin in a solvent within a reactor system to produce a single phase polymer solution;

(b) quenching the polymerization reaction downstream of the reactor system with a catalyst deactivator;

(c) reducing the pressure of the single phase polymer solution downstream of the reactor system to a pressure which induces the single phase polymer solution to undergo liquid-liquid phase separation into a two phase polymer solution;

(d) feeding the two phase polymer solution through a heat exchanger system, wherein the heat transfer coefficient U, of at least one heat exchanger is increased by adding at least one surface active agent to the polymer solution downstream of the reactor system and upstream of the heat exchanger system, and wherein the surface active agent and the catalyst deactivator are the same compound, provided that the surface active agent is added in an amount higher than the amount of surface active agent required to quench the polymerization reaction; and (e) feeding the polymer solution effluent from the heat exchanger system directly to a flash devolatilization system.

The invention also provides, a high temperature solution polymerization process comprising:

(a) polymerizing ethylene and optionally an alpha-olefin in a solvent within a reactor system to produce a single phase polymer solution;

(b) quenching the polymerization reaction downstream of the reactor system;

(c) reducing the pressure of the single phase polymer solution downstream of the reactor system to a pressure which induces the single phase polymer solution to undergo liquid-liquid phase separation into a two phase polymer solution;

(d) feeding the two phase polymer solution through a heat exchanger system comprising at least one heat exchanger, wherein the heat transfer coefficient U, of at least one heat exchanger is increased by adding at least one surface active agent to the polymer solution downstream of the reactor system and upstream of the heat exchanger system; and (e) feeding the polymer solution effluent from the heat exchanger system directly to a flash devolatilization system;

wherein the amount of surface active agent added to the polymer solution downstream of the reactor system and upstream of the heat exchanger system is sufficient to both increase the heat transfer coefficient U, of at least one heat exchanger and to quench the polymerization reaction.

In the present invention, very low levels of surface active agent are added to a two phase liquid-liquid polymer solution to increase the heat transfer coefficient, U, of a at least one heat exchanger, by more than 10%.

In an embodiment of the invention, the surface active agents will be added in amounts from 0.1 ppm to 1000 ppm, preferably from 1 ppm to 1000 ppm, even more preferably from 1 ppm to 100 ppm.

In an embodiment of the current invention, the surface active agent is selected from the group consisting of carboxylate, sulfate, phosphate, phosphonate, and sulfonate compounds comprising a branched or un-branched, saturated or unsaturated alkyl group comprising 6 to 30 carbon atom, and mixtures thereof.

In an embodiment of the invention, the pressure of the single phase polymer solution is reduced by opening one or more pressure let down valves downstream of the reactor system.

The invention also provides, a high temperature solution polymerization process comprising:

(a) polymerizing one or more than one olefin in a solvent within a reactor system to produce a single phase polymer solution;

(b) quenching the polymerization reaction downstream of the reactor system with a catalyst deactivator;

(c) reducing the pressure of the single phase polymer solution downstream of the reactor system to a pressure which induces the single phase polymer solution to undergo liquid-liquid phase separation into a two phase polymer solution; and (d) feeding the two phase polymer solution through a heat exchanger system, wherein the heat transfer coefficient, U, of at least one heat exchanger is increased by adding at least one surface active agent to the polymer solution downstream of the reactor system and upstream of the heat exchanger system, and wherein the surface active agent and the catalyst deactivator are the same compound, provided that the surface active agent is added in an amount higher than the amount of surface active agent required to quench the polymerization reaction.

DETAILED DESCRIPTION

Solution processes for the homo-polymerization or co-polymerization of ethylene are well known in the art. Solution polymerization processes are used commercially to prepare a wide variety of ethylene polymers, ranging from crystalline polyethylene plastics to amorphous ethylene-propylene elastomers. It is desirable to operate these processes at high temperatures because increasing the polymerization temperature can (a) improve the rate of polymerization; (b) lower the viscosity of the polymer solution; and (c) reduce the amount of energy required to recover the polymer from the solvent.

Solution processes are commonly conducted in the presence of an inert hydrocarbon solvent, typically a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

The polymerization temperature in a high temperature solution process is from about 80° C. to about 300° C., preferably from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature will preferably be between 200 and 300° C. The most preferred reaction process is a "medium pressure process", meaning that the pressure in the reactor is preferably less than about 6,000 psi (about 42,000 kiloPascals or kPa). Preferred pressures are from 10,000 to 40,000 kPa, most preferably from about 2,000 psi to 3,000 psi (about 14,000-22,000 kPa).

The pressure in the reactor system should be high enough to maintain the polymerization solution as a single phase polymerization solution and to provide the necessary upstream pressure to feed the polymer solution from the reactor system through a heat exchanger system and to a devolatilization system.

Suitable monomers for co-polymerization with ethylene include $C_{3-20}$ mono- and di-olefins. Preferred comonomers include $C_{3-12}$ alpha olefins which are unsubstituted or substituted by up to two $C_{1-6}$ alkyl radicals; $C_{8-12}$ vinyl aromatic monomers which are unsubstituted or substituted by up to two substituents selected from the group consisting of $C_{1-4}$ alkyl radicals; $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, 1-decene, butadiene, styrene, alpha methyl styrene, and the constrained-ring cyclic olefins such as cyclobutene, cyclopentene, dicyclopentadiene, norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment of the invention the polymerization process is carried out in the presence of at least 75 weight % of ethylene based on the weight of ethylene and alpha olefins present in a reactor system.

In an embodiment of the invention the polymerization process is carried out in the presence of at least 85 weight % of ethylene based on the weight of ethylene and alpha olefins present in a reactor system.

The polyethylene polymers which may be prepared in accordance with the present invention are linear low density polyethylenes (LLDPE's) which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc (the so-called very low and ultra low density polyethylenes).

Generally the alpha olefin may be present in a polyethylene copolymer in an amount from about 3 to 30 weight %, or from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The solution polymerization process of this invention uses a stirred "reactor system" comprising one or more stirred polymerization reactors. In a dual reactor system, where two reactors are arranged in series, the first polymerization reactor preferably operates at lower temperature than the second polymerization reactor. In a dual reactor system, the polymerization temperature in the first reactor can be from about 80° C. to about 180° C., while the temperature in the second reactor can be up to about 250° C. The residence time in each reactor will depend on the design and the capacity of the reactor. Generally the reactors should be operated under conditions to achieve a thorough mixing of the reactants. In addition, it is preferred that from 20 to 60 weight % of the final polymer is polymerized in the first reactor, with the balance being polymerized in the second reactor. On leaving the reactor system (i.e. a second polymerization reactor in the case of a dual reactor system) the polymer solution is passed through a heat exchanger system (as described further below) on route to a devolatilization system and polymer finishing area. It is preferable for the polymer solution effluent leaving the heat exchanger system to be feed directly toward a devolatilization system.

Conventional devolatilization systems (i.e. flash devolatilization systems) are well known to persons skilled in the art and are suitable for use in the process of the current invention. See for example U.S. Pat. Nos. 4,547,473; 5,708,133; 5,691,445; and PCT Appl. No. 98/02471 and references therein which are incorporated herein in their entirety.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc (e.g. U.S. Pat. No. 5,589,555, issued Dec. 31, 1996).

The catalyst components may be fed to a reaction either as a slurry or solution in any one or a number of different hydrocarbons including aromatic and non-aromatic hydrocarbons.

Other polymers that can be made in a solution polymerization process according to the current invention include but are not limited to homopolymers, copolymers and terpolymers of one or more of propylene, styrene and butadiene.

Catalysts useful for solution polymerization are well known in the art. In general the invention can be used with any single site catalyst (SSC), Ziegler-Natta, chromium catalyst or any other organometallic catalyst capable of polymerizing olefins in a solution process.

Single site catalysts generally contain a transition element of Groups 3-10 of the Periodic Table and at least one supporting ligand. Some non-limiting examples of single site catalysts include metallocenes which contain two functional cyclopentadienyl ligands (see for example WO 9941294), constrained geometry catalysts (see for example EP 418044) and catalysts having at least one phosphinimide ligand (see for example U.S. Pat. Nos. 6,777,509, 6,372,864 and 6,984,695).

For examples of solution phase polymerization using polymerization catalysts having at least one phosphinimine ligand see U.S. Pat. Nos. 6,777,509, 6,372,864 and 6,984,695.

Single site catalysts are typically activated by suitable cocatalytic materials (i.e. "activators") to perform the polymerization reaction. Suitable activators or cocatalytic materials are also well known to those skilled in the art. For example, suitable cocatalysts include but are not limited to electrophilic boron based activators and ionic activators, which are well known for use with metallocene catalysts, constrained geometry catalysts and catalysts having at least one phosphinimide ligand (see for example, U.S. Pat. No. 5,198,401 and U.S. Pat. No. 5,132,380). Suitable activators including boron based activators are further described in U.S. Pat. No. 6,777,509. In addition to electrophilic boron activators and ionic activators, alkylaluminum, alkyl/alkoxyaluminum, alkylaluminoxane, modified alkylaluminoxane compounds and the like, can be added as cocatalytic components. Such components have been described previously in the art (see for example U.S. Pat. No. 6,777,509).

In an embodiment of the invention the polymerization process is carried out in the presence of a catalyst comprising: a catalyst having at least one phosphinimine ligand (i.e. a phosphinimine catalyst) and a cocatalyst.

In an embodiment of the invention, the phosphinimine catalyst is defined by the formula: $(Cp)_n(PI)_mMX_p$ where M is a transition metal selected from Ti, Hf, Zr; PI is a phosphinimine ligand; Cp is a cyclopentadienyl type ligand; X is an activatable ligand; m is 1 or 2; n is 0 or 1; and p is determined by the valency of the metal M.

The phosphinimine ligand is defined by the formula: $R^1{}_3P=N-$ wherein each $R^1$ is independently selected from the group consisting of a hydrogen atom; a halogen atom; $C_{1-20}$ hydrocarbyl radicals which are unsubstituted by or further substituted by one or more halogen atom; $C_{1-20}$ alkyl radical; $C_{1-8}$ alkoxy radical; $C_{6-10}$ aryl or aryloxy radical; amido radical; silyl radical of the formula: $-SiR^2{}_3$ wherein each $R^2$ is independently selected from the group consisting of hydrogen, a $C_{1-8}$ alkyl or alkoxy radical, $C_{6-10}$ aryl or aryloxy radicals; and germanyl radical of the formula: $-GeR^2{}_3$ wherein $R^2$ is as defined above.

In an embodiment of the invention the phosphinimine ligand is chosen so that each $R^1$ is a hydrocarbyl radical. In a particular embodiment of the invention, the phosphinimine ligand is tri-(tertiary butyl)phosphinimine (i.e. where each $R^1$ is a tertiary butyl group).

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom; $C_{1-8}$ alkoxy radical; a $C_{1-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $-Si(R)_3$ wherein each R is independently selected from the group consisting of hydrogen, a $C_{1-8}$ alkyl or alkoxy radical $C_{6-10}$ aryl or aryloxy radicals; and germanyl radicals of the formula $-Ge(R)_3$ wherein R is as defined directly above.

The term "Ziegler Natta catalyst" is well known to those skilled in the art and is used herein to convey its conventional meaning. Ziegler Natta catalysts comprise at least one transition metal compound of a transition metal selected from groups 3, 4, or 5 of the Periodic Table (using IUPAC nomenclature) and an organoaluminum component that is defined by the formula:

wherein: X' is a halide (preferably chlorine); OR is an alkoxy or aryloxy group; R is a hydrocarbyl (preferably an alkyl having from 1 to 10 carbon atoms); and a, b, or c are each 0, 1, 2, or 3 with the provisos, a+b+c=3 and b+c>=1. As will be appreciated by those skilled in the art of ethylene polymerization, conventional Ziegler Natta catalysts may also incorporate additional components such as an electron donor. For example, an amine or a magnesium compound or a magnesium alkyl such as butyl ethyl magnesium and a halide source (which is typically a chloride such as tertiary butyl chloride). Such components, if employed, may be added to the other catalyst components prior to introduction to the reactor or may be added directly to the reactor. The Ziegler Natta catalyst may also be "tempered" (i.e. heat treated) prior to being introduced to the reactor (again, using techniques which are well known to those skilled in the art and published in the literature).

The current invention also contemplates the use of chromium catalysts that are also well known in the art. The term "chromium catalysts" describes olefin polymerization catalysts comprising a chromium species, such as silyl chromate, chromium oxide, or chromocene on a metal oxide support such as silica or alumina. Suitable cocatalysts for chromium catalysts, are well known in the art, and include for example, trialkylaluminum, alkylaluminoxane, dialkoxyalkylaluminum compounds and the like.

In the current invention the term "polymer solution" can be any solution containing both dissolved or molten homo- or co-polymer, one or more solvents, one or more catalyst components, and one or more monomers or comonomers. The polymer solution may also contain quenching reagents as well as dissolved inert gases or dissolved hydrogen gas.

The effluent polymer solution from the reactor (or from the final reactor if two or more reactors are used in series) is quenched by addition of a catalyst deactivator and then heated by passage through a heat exchanger system. The "heat exchanger system" of the current invention comprises at least one heat exchanger. The catalyst deactivator suppresses or stops further polymerization within the polymer solution. The heat exchanger effluent is fed to a flash devolatilization system.

Catalyst deactivators can be used either to slow down the rate of polymerization or to stop it entirely. In a typical solution plant, the deactivators used substantially stop the polymerization reaction by changing the active catalyst into an inactive form. Most commonly, these activators take the form of polar molecules containing active hydrogen atoms and/or atoms which are capable of irreversibly binding to the metal center of the active catalyst.

In the current invention, those catalyst components that react with a catalyst deactivator are defined as "deactivator reactive catalyst components". Deactivator reactive catalyst components may be single site catalysts, Ziegler-Natta catalysts, chromium catalysts, organometallic catalysts, and cocatalysts or activator compounds, which irreversibly react with a catalyst deactivator.

Suitable deactivators are well known in the art and include but are not limited to amines (see U.S. Pat. No. 4,803,259 to Zboril et al.); alkali or alkaline earth metal salts of carboxylic acid (see for example U.S. Pat. No. 4,105,609 to Machon et al); water (see for example U.S. Pat. No. 4,731,438 to Bernier et al); hydrotalcites (see U.S. Pat. No. 4,379,882), alcohols and carboxylic acids (see U.S. Pat. No. 6,180,730).

Generally, the catalyst deactivators will be added in the minimum amount required to substantially quench the polymerization reaction. This in turn minimizes cost, but also the amount of un-reacted catalyst deactivators present in the product resin.

The use of one or more deactivators or mixtures thereof is also contemplated by the current invention.

Preferred deactivators should also satisfy the following requirements: a deactivator must deactivate the catalyst rapidly; should not deposit on the equipment (particularly on heat exchanger surfaces); should not generate color or odor and should be safe and non-toxic. This limits the types of useful deactivators and dictates the way they are added to the reactor effluent. Accordingly, the selection of optimal deactivators and the method of their use depends upon the polymerization process used.

In an embodiment of the current invention, each heat exchanger in a heat exchanger system will be a shell and tube type heat exchanger. Due to their ease of operation and to their good reliability, shell and tube heat type heat exchangers have become a preferred means for cooling or heating fluid flows and are well known in the art. However, other heat exchangers including but not limited to double pipe, flat-plate and spiral wound heat exchangers may also be used with the current invention.

In a heat exchanger, a "hot" fluid is brought into thermal contact with a "cold" fluid facilitating heat transfer across a heat exchange surface. The heat transfer may occur by a forced convection or a condensation mechanism. The heat exchange surface is preferably constructed from stainless steel or from other suitable metal alloys that allow for good heat transfer. A typical shell and tube heat exchanger is comprised of an open shell like structure, the "shell side" which encases a number of tubes that traverse the length of the shell structure. The inside of the tubes is collectively designated as the "tube side". The tubes are held in a "tube sheet" at each end of the shell housing, the tube sheet forming a barrier between the tube channels and the inside of the shell. The shell housing is equipped with an inlet and an outlet, between which a series of baffles may be placed to provide a torturous fluid flow pathway. During heat exchange, a fluid flow traverses the distance from inlet to outlet on the "shell side" of the exchanger, and comes into thermal contact with a fluid flow traversing the length of the tubes on the "tube side" of the exchanger. The "tube side" of a heat exchanger can also be said to have an inlet and an outlet upstream and downstream of each end of the tube sheet respectively.

In a preferred embodiment of the current invention a "hot" fluid flows though a heat exchanger on the "shell side", while a polymer solution, which is the "cold" fluid, passes through the heat exchanger on the "tube side". The heating fluid may be, but is not limited to, steam, oil, or recycled monomer/solvent streams. Without wishing to be bound by theory, the heat transfer may occur via a forced convention or condensation mechanism. In a preferred embodiment of the current invention, the heating fluid is high pressure steam.

Increasing the number of tubes that are enclosed within the shell structure increases the overall surface area of the heat exchange surface between the two fluids. In a preferred embodiment, the number of tubes is sufficient to provide efficient heat transfer to a polymer solution passing through the heat exchanger at a mass flow rate of more than about 180-400 tons/h. In one embodiment, the tubes may be 0.5 to 1.0 inch in diameter and there may be over 3000 tubes in a heat exchanger tube sheet. In another embodiment, static mixing inserts can be added to the tubes to improve polymer solution mixing and heat transfer efficiency.

Heat exchangers used in the current invention may be of a single-pass or a multi-pass type, examples of which are well known in the art. The flow of fluids through the heat exchanger may be cross or counter flow (flow of "hot" and "cold" fluids is in approximately opposite directions) or unidirection parallel flow ("hot" and "cold" fluids flow in approximately the same direction). The fluid on the shell side may also condense to yield efficient heat transfer. In a preferred embodiment, a one pass shell and tube heat exchanger is operated in a cross-counter flow arrangement. Heat exchangers may be configured vertically or horizontally, but are preferably in a vertical configuration.

In the current invention, heat exchangers will have a "tube side" polymer solution inlet temperature, $T_{cold,inlet}$ (i.e. the temperature at the front end or upstream end of the heat exchanger tube sheet) and a "tube side" polymer solution outlet temperature, $T_{cold,outlet}$, i.e. the temperature at the back end or the downstream end of the heat exchanger tube sheet), since the polymer solution is the "cold" fluid and flows through the tube side of the heat exchanger. The polymer solution flowing through a heat exchanger will have a temperature that increases along a temperature gradient as it flows from inlet to outlet. For a heat exchanger immediately downstream of the reactor system, the $T_{cold,inlet}$ will be similar to the temperature in the final polymerization reactor and can be in the range of between about 150° C. and 230° C. Similarly, the heat exchangers will have a "shell side" heating fluid (i.e. the "hot" fluid) inlet temperature, $T_{hot,inlet}$, and a "shell side" heating fluid outlet temperature, $T_{hot,outlet}$. The $T_{cold,inlet}$, $T_{hot,inlet}$, $T_{hot,outlet}$, and $T_{cold,outlet}$ can be determined by any well known method, such as but not limited to the use of a thermocouple device.

In an embodiment of the invention, the heat exchanger system comprises a single heat exchanger, provided sufficient heat is transferred to the polymer solution for efficient devolatilization. In another embodiment of the current invention, the heat exchanger system comprises a combination of heat exchangers, individually in series or in parallel, to achieve sufficient heat transfer to the polymer solution for efficient devolatilization. Sufficient temperatures are from about 220° C. to 300° C. (i.e. $T_{cold,outlet}$ of the final heat exchanger immediately upstream of the devolatilizer is from 220° C. to 300° C.). In another aspect of the invention the $T_{cold,outlet}$ will be from 250° C. to 300° C.

A heat exchanger will have a "tube side" inlet pressure, $P_{IN}$ (i.e. the pressure at the front end or upstream end of the heat exchanger tube sheet) and a "tube side" outlet pressure, $P_{OUT}$ (i.e. the pressure at the back end or downstream end of the heat exchanger tube sheet). In the current invention, $P_{IN}$ will be greater than $P_{OUT}$ such that $P_{IN}-P_{OUT}$ is positive. $P_{IN}$ and $P_{OUT}$ are readily measured using any well known technique, such as but not limited to transducers or pressure gauges. Convenient units for $P_{IN}$ and $P_{OUT}$ are MPag.

The heat exchanger inlet and outlet pressures can be adjusted using pressure let down valves that are upstream and downstream of a heat exchanger respectively. If two or more heat exchangers are used in series then additional pressure let down valves may be incorporated such that there is at least one let down pressure valve between each of the heat exchangers.

In an embodiment of the current invention, two or more heat exchangers are used in series, each of which is downstream of a final polymerization reactor, and upstream of a flash devolatilization system.

The efficiency of heat transfer within a shell-and-tube heat exchanger with one or more tube passes is expressed using the overall heat transfer coefficient, U. The overall heat transfer coefficient, U, for each heat exchanger is related to the total rate of heat transferred in that heat exchanger, Q. The total rate of heat transfer, Q, can be determined from the temperature rise of the fluid on the tube side of the heat exchanger or from the loss of enthalpy from the heating fluid on the shell side of the heat exchanger. The heat transfer coefficient is related to Q as follows:

$$Q = FUA\Delta T_{lm} \quad \text{(Eqn. 1)}$$

where F is a heat exchanger design factor, which in the current invention has been set to equal one (the F design factor is a characteristic of a given heat exchanger design and is a dimensionless quantity often equal to about one), A is the area available for the heat transfer through the tube walls, and $\Delta T_{lm}$ is the log mean temperature difference across the heat exchanger. The log mean temperature difference is a function of inlet and outlet temperatures on the colder and hotter sides of the heat exchanger respectively, $$\Delta T_{lm} = \frac{\Delta T_1 - \Delta T_2}{\ln(\Delta T_1 / \Delta T_2)} \quad \text{(Eqn. 2)}$$

where $\Delta T_1 = T_{hot,inlet} - T_{cold,outlet}$ and $\Delta T_2 = T_{hot,outlet} - T_{cold,inlet}$ for a cross-counter flow heat exchanger. In the present invention, the polymer solution is the "cold" fluid flowing through the tube side of the heat exchanger. Hence, at the upstream side of the heat exchanger, the tube side inlet, temperature is defined as the $T_{cold,inlet}$. The "hot fluid" flowing through the shell side has an inlet temperature, defined as the $T_{hot,inlet}$. Similarly, the downstream end of the heat exchanger has a tube side, $T_{cold,outlet}$ and a shell side $T_{hot,outlet}$. For a given heat exchanger, A is known. The values of Q and $\Delta T_{lm}$ are determined from the process conditions. The value of Q is determined from the enthalpy change, either of the tube side fluid or of the shell side fluid. The enthalpy change can be determined by integrating the heat capacity of a fluid, when there is no phase change of the fluid, or from the enthalpy of condensation of the fluid when there is condensation. Equation 1 is then used to calculate the value of the heat transfer coefficient, U, under a given set of process conditions. The more efficient a heat exchanger with a given heat exchange surface area is, the larger the value of the heat transfer coefficient, U. Equation 1 can be used to characterize heat transfer rates, and hence the coefficient U, in heat exchangers conveying single or multiphase fluids. U is conveniently expressed in $kW/m^2/K$.

Inducing Phase Separation

In a first aspect of the current invention, the pressure of the single phase polymer solution is reduced downstream of a reactor system to a pressure that induces the polymer solution to phase separate into a two phase liquid-liquid polymer solution. Preferably, the phase separation occurs downstream of a reactor system and upstream of a heat exchanger system. Optionally, the phase separation may occur within a heat exchanger system. The pressure can be reduced downstream of the reactor system by use of one or more pressure let down valves located downstream of a reactor system. The pressure let down valves can be upstream and/or downstream of each heat exchanger.

In the current invention, a single phase (i.e. a single liquid phase) polymerization solution is preferably present in the reactor system, and process conditions, such as but not limited to monomer concentration, temperature and pressure, are controlled to avoid liquid-liquid phase separation in the reactor system.

The term "two-phase liquid-liquid polymer solution" is meant to encompass any polymer solution that comprises a distinct polymer rich phase and a distinct polymer lean phase. A "polymer lean" phase is defined as having at least 90 weight percent (wt %) of solvent. A "polymer-rich" phase is defined as having at least 10 weight percent (wt %) of polymer. In the current invention, concentration is typically expressed in terms of weight fraction, wt % or weight percent, wt % of a component in a polymer solution.

Phase separation behavior and more specifically, cloud point determination of polymer solutions can be modeled off-line using representative polymer solutions of known composition. In the current invention, phase separation data in the form of a vapor-liquid-liquid (VLL) diagram is obtained using a multi-pass rheometer (MPR). The multi-pass rheometer is a capillary rheometer in which several capillaries of different lengths and diameters are enclosed within a high temperature/pressure cell that is capable of confining a solution. The vertical cell has pistons at both ends of the cell and during operation the solution is sheared back and forth through the capillaries. Under conditions in which a steady shear is achieved, the pressure drop across the capillaries, $P_{IN} - P_{OUT}$ is measured and the apparent viscosity of the fluid is determined as a function of the shear rate in each capillary. Before the shearing is initiated, the pistons are moved with respect to each other in order to obtain a desired static pressure for the system.

The "apparent viscosity", $\mu_A$ of a polymer solution is defined for a given shear rate as the pressure drop, $\Delta P$ across the capillaries when a polymer solution is forced through a capillary of constant diameter, at a constant static pressure, temperature and polymer solution composition. The apparent viscosity, $\mu_A$ is equal to the ratio of "shear wall stress", $\tau_w$, to "wall shear rate", $\dot{\gamma}_{WN}$, for a Newtonian fluid:

$$\mu_A = \frac{\tau_W}{\dot{\gamma}_{WN}} = \frac{R^2 \Delta P}{8LV} \quad \text{(Eq. 3)}$$

where V is the average fluid velocity in the tube in m/s (i.e. the velocity at which the pistons are moved within the capillaries), $\Delta P$ is the pressure drop across the capillaries in MPa (or Pa), L is the length of the capillaries in meters, R is the radius of the capillaries in meters and $\tau_W$ is defined as above.

A person skilled in the art will recognize that use of a multi-pass rheometer in the prescribed manner allows for the measurement of the apparent viscosity of representative off line polymer solutions as a function of temperature, pressure and shear rate.

The apparent viscosity of a polymer solution undergoes a dramatic change at the cloud point pressure, due to the formation of two liquid phases. Measurement of the cloud point pressure at different temperatures yields a cloud point curve which demarcates the two liquid region from the single liquid region of the phase diagram for a given polymer solution. By way of example, the phase behavior of a polymer solution of the current invention may be approximated by the isoplethic phase diagram (i.e. a vapor-liquid-liquid phase diagram) for a polymer-solvent mixture containing a small amount of monomer as provided in FIG. 1.

Figure 1:
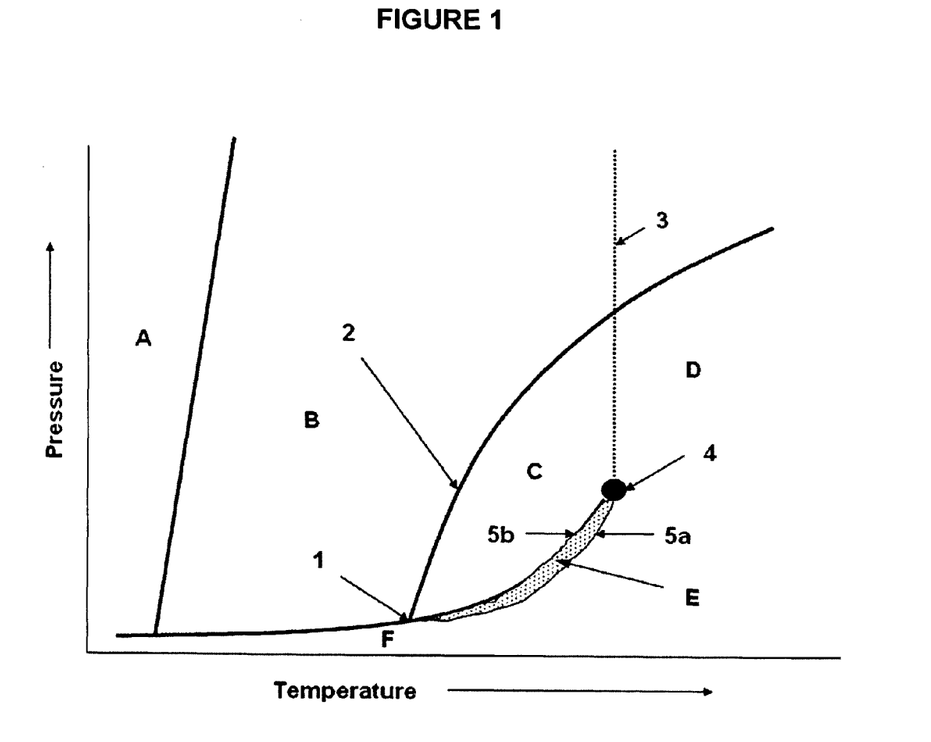
FIG. 1 is a vapor-liquid-liquid (VLL) phase diagram that shows the phase behavior of a polydisperse polyethylene polymer solution with a small amount of ethylene present.

With reference to FIG. 1, A defines the liquid-amorphous solid region; B defines the single liquid region (i.e. the single phase polymer solution); C defines the liquid-liquid region (i.e. the two phase liquid-liquid polymer solution); D defines the supercritical fluid region; E defines the vapor-liquid-liquid region; F defines the vapor-liquid region; 2 defines the cloud point boundary or the lower critical solution temperature (the LCST) curve; 1 defines the lower critical end point; 3 defines the critical temperature of solvent; and 4 defines solvent vapor-liquid critical point. For the polymer solutions of the current invention, 5a is the lower boundary of the vapor-liquid-liquid region and 5b is the upper boundary of the vapor-liquid-liquid region.

It will be recognized by one skilled in the art, that the pressure required for inducing the formation of two liquid phases for a range of polymer solutions can be predicted by generating a curve similar to that shown in FIG. 1. Hence, generation of vapor-liquid-liquid or liquid-liquid phase diagrams for representative polymer solutions allows for the prediction of on-line conditions under which liquid-liquid phase separation occurs.

A two-phase polymer solution of the current invention may undergo one or more phase inversions during flow through a heat exchanger.

Without wishing to be bound by theory, phase-inversion behavior may lead to rapid changes in the apparent viscosity of the two-phase polymer solution. By phase inversion, it is meant that the polymer solution interconverts between a system comprising polymer lean phase droplets dispersed in a continuous polymer rich phase and a system comprising polymer rich phase droplets dispersed in a continuous polymer lean phase.

The exact location of the liquid-liquid phase boundary in the present invention (i.e. pressure required for obtaining polymer solution phase separation) will depend on a number of other factors (in addition to temperature and pressure) including but not limited the weight fractions of polymer, solvent or monomer dissolved in the polymer solution and the polymer molecular weight distribution. As a result, there is no one set of conditions under which phase separation may be induced.

For the purposes of this invention, factors such as the temperature of the polymer solution, the weight fraction of monomer dissolved in the polymer solution, the weight fraction of polymer in the polymer solution, the polymer molecular weight and the solvent composition are such that the liquid-liquid phase boundary is traversable under commercially viable pressures.

Surface Active Agents

In a second aspect of the present invention, at least one surface active agent is added to the polymer solution downstream of a reactor system and upstream of a heat exchanger system.

The surface active agent may be added in any known manner. By way of non-limiting example, the surface active agent may be added as a solution in the main process solvent and introduced into the flow at a tee junction, following which it is mixed into the main flow using a static mixing element in the main pipe.

The addition of a surface active agent is used in combination with conditions under which the polymer solution is induced to undergo phase separation into a two phase liquid-liquid polymer solution. A surface active agent can be added to the polymer solution before or after the polymer solution is induced to undergo liquid-liquid phase separation, provided that the surface active agent is added upstream of a heat exchanger system.

In the current invention, when a two phase liquid-liquid polymer solution is formed, the presence of sufficient amounts of surface active agent increases the heat transfer coefficient, U, of at least one heat exchanger in a heat exchanger system, thereby increasing the efficiency of heat transfer from a heat transfer fluid (i.e. the "hot" fluid) to the polymer solution (i.e. the "cold" fluid).

In an embodiment of the invention, the surface active agents will be added in amounts from 0.1 ppm to 1000 ppm, preferably from 1 ppm to 1000 ppm, even more preferably from 1 ppm to 100 ppm (i.e. parts per million by weight of the polymer solution).

By adding a surface active agent, the heat transfer coefficient, U can be increased by at least 5%, preferably by at least 10%.

Without wishing to be bound by theory, the low levels of surface active agent may collect at the interfaces between the liquid interfaces of a two phase liquid-liquid polymer solution in such a way as to enhance the efficiency of heat transfer from a heat transfer fluid, across a heat exchange surface, to the two phase liquid-liquid polymer solution. For example, the surface active agent may lower the interfacial tension, by promoting phase inversion of polymer lean and polymer rich phases, to a level that permits the stabilization of a two-phase morphology, which is conducive to efficient heat transfer. Reducing the interfacial tension then between polymer lean and polymer rich liquid phases, may facilitate the coating of a heat transfer surface by a phase which has high thermal conductivity, or alternatively, by the stabilization of a droplet size distribution which leads to a more effective thermal conductivity.

The surface active agents used in the current invention can be selected from a wide range compounds comprising a hydrophobic tail moiety and a hydrophilic head moiety. Such compounds include amphiphilic anionic, cationic and neutral compounds, as well as amphoteric compounds, all of which are well known in the art. Anionic surface active agents are compounds in which the hydrophilic head moiety has an anionic charge or may assume an anionic charge in aqueous solution. Cationic surface active agents are compounds in which the hydrophilic head moiety has a cationic charge or may assume a cationic charge in aqueous solution. Non-ionic surface active agents are compounds that do not dissociate into charged ions in aqueous solution. Amphoteric surface active agents have a hydrophilic head moiety that is zwitterionic (i.e. has both an anionic and a cationic charge).

In an embodiment of the current invention, the anionic surface active agents are selected from the group consisting of carboxylate, sulfate, sulfonate, phosphate, phosphonate, compounds and mixtures thereof. The carboxylate, sulfate, sulfonate, phosphate and phosphonate, compounds may be used in acid or salt form. Phenolate; cyanate; and thiocyanate compounds; as well as polyelectrolytes and anionic polymers such as but not limited to polyacrylate are also contemplated for use with the current invention.

In an embodiment of the invention, anionic surface active agents include, but are not limited to carboxylic acids; sulfonic acids; sulfuric acids esters; phosphoric acid esters; phosphonates; and salts thereof, bearing alkyl, aryl, aralkyl, or alkaryl groups having from six to thirty carbon atoms (i.e. $C_7$ to $C_{31}$ carboxylic acids, sulfuric acid esters, sulfonic acids, phosphonic acids, phosphoric acid esters and/or salts thereof). The alkyl groups may be linear or branched, saturated or unsaturated.

In an embodiment of the invention, anionic surface active agents include, but are not limited to salts or acids of: carboxylates such as lauryl, stearyl, oleyl and cetyl carboxylates; sulfates such as alkyl ether sulfates, alkyl ester sulfates and alkyl benzene sulfates; sulfonates such as alkylbenzene sulfonate, alkylnaphthalene sulfonate, paraffin sulfonate; phosphonates; phosphates such as alkyl ether phosphates or alkyl ester phosphates, and polyphosphates.

In an embodiment of the current invention, the anionic surface active agents are salts or acids of: carboxylates, $(R^5)COO^-$; phosphates, $(R^5)OPO(OH)O^-$; sulfates, $(R^5)OSO_3^-$; sulfonates, $(R^5)SO_3^-$ and mixtures thereof where, $R^5$ is selected from the group consisting of linear or branched, saturated or unsaturated alkyl groups having from 3 to 30 carbon atoms; aralkyl groups which are substituted benzyl moieties including fused ring moieties, having linear chains or branches of from 3 to 22 carbons; alkaryl or substituted aryl groups including fused ring groups, having linear chains or branches of from 3 to 22 carbons.

In an embodiment of the current invention, the surface active agent is a carboxylic acid having a linear saturated alkyl group that is 5 to 13 carbons long (i.e. a $C_6$ to $C_{14}$ carboxylic acid) or a mixture of at least two carboxylic acids having a linear saturated alkyl group that is 5 to 13 carbons long.

In an embodiment of the current invention, the surface active agent is a carboxylic acid having a linear saturated alkyl group that is 6, 8, 10 or 12 carbons long (i.e. a $C_7$, $C_9$, $C_{11}$ or $C_{13}$ carboxylic acid) or a mixture thereof, such as but not limited to pelargonic acid and nonanoic acid.

In an embodiment of the invention, the cationic surface active agents are selected from the group consisting of quaternary ammonium, phosphonium, sulfonium, pyridinium, and imidazolium compounds and mixtures thereof.

In an embodiment of the invention, the cationic surface active agent is a compound that has at least one long chain linear or branched, saturated or unsaturated alkyl group having from 6 to 30 carbon atoms. The remaining groups of the cation can be selected from the group consisting of hydrogen; linear or branched, saturated or unsaturated alkyl groups; cyclic alkyl groups; aromatic groups; benzyl groups and substituted benzyl groups; and the like. Suitable long chain alkyl groups may be derived from naturally occurring oils, animal oils or fats, or may be petrochemically derived. Some non-limiting examples include methylstearyl, ethylstearyl, methyloleyl, ethyloleyl, layryl, stearyl, tridecyl, tetradecyl, pentadecyl, hexadecyl, hydrogenated tallow, docosanyl, oleyl, linoleyl, linolenyl, soya and tallow.

In an embodiment of the invention, the cationic surface active agent contains at least one linear or branched alkyl, aliphatic, aralkyl, alkaryl, or aromatic hydrocarbon group having from 6 to 30 carbon atoms, or alkyl or alkyl-ester groups having from 6 to 30 carbon atoms. The remaining groups of the cationic surface active agent can be selected from a group consisting of linear or branched alkyl groups containing from 1 to 30 carbon atoms; aralkyl groups such as benzyl and substituted benzyl moieties including fused ring moieties, having linear chains or branches of from 1 to 22 carbons; alkaryl groups; aryl groups such as phenyl and substituted phenyls including fused ring aromatic groups and substituents; and hydrogen.

In an embodiment of the current invention, the cationic surface active agent can be a salt of: $[(R^1)(R^2)(R^3)(R^4)N]^+$, $[(R^1)(R^2)(R^3)(R^4)P]^+$, $[(R^1)(R^2)(R^3)S]^+$ or mixtures thereof, where $R^1$ is a linear or branched alkyl, aralkyl, alkaryl, or aromatic hydrocarbon group having from 8 to 30 carbon atoms, or alkyl or alkyl-ester groups having from 8 to 30 carbon atoms; and $R^2$ to $R^4$ are selected from the group consisting of linear or branched alkyl groups containing from 1 to 30 carbon atoms; aralkyl groups such as benzyl and substituted benzyl moieties including fused ring moieties, having linear chains or branches of from 1 to 22 carbons; alkaryl groups; aryl groups such as phenyl and substituted phenyls groups including fused ring aromatic groups and substituents; and hydrogen.

In an embodiment of the current invention, quaternary ammonium or phosphonium compounds bearing alkyl, aryl, aralkyl or alkaryl groups are used as surface active agents.

In an embodiment of the invention, the non-ionic surface active agents are selected from the group consisting of ethoxylates, polyethylene glycol ethers, fatty acid alkylolamides, sucrose fatty acid esters, polyglucosides, or amine oxides and mixtures thereof. Suitable non-ionic surface active agents include but are not limited to $C_6$-$C_{18}$ alkylphenol alkoxylates, $C_{12}$-$C_{20}$ alkanol alkoxylates and block copolymers of ethylene oxide and propylene oxide, and $C_4$-$C_{18}$ alkyl glucosides, and products obtained by reaction of alkyl glucosides with ethylene oxide.

In an embodiment of the invention, the amphoteric surface active agents are selected from the group consisting of aminocarboxylic acids, betaines, and sulfobetaines and mixtures thereof.

The surface active agent can be added to the polymer solution before or after the addition of a catalyst deactivator or at the same time, provided that the addition of the surface active agent is upstream of a heat exchanger system. A surface active agent may be added to the polymer solution upstream or downstream of a catalyst deactivator or at the same entry point, provided that the addition of the surface active agent is upstream of a heat exchanger system.

In some embodiments of the invention, the surface active agents described above, are also capable of quenching the polymerization reaction. For example, surface active agents containing an active hydrogen such as but not limited to carboxylic acids, sulfuric acid esters, sulfonic acids, phosphoric acid esters and phosphonic acids may be used to quench the polymerization in addition to increasing the coefficient of heat transfer in at least one heat exchanger. Thus, in some embodiments of the invention, the catalyst deactivator and the surface active agent can be the same compound and separate process steps to introduce the catalyst deactivator and the surface active agent are not required.

In an embodiment of the current invention, the surface active agent is also a catalyst deactivator and is added to a polymer solution downstream of a reactor system and upstream of a heat exchanger system.

Where the surface active agent also acts as a catalyst deactivator, the amount of surface active agent required to obtain an increase in the heat exchanger system efficiency (as measured by an increase in the heat transfer coefficient, U of at least one heat exchanger) must be sufficient to overcome the amount of surface active agent consumed during reactions to quench polymerization. By way of non-limiting example, less than about 3 ppm of surface active agent is required to quench the polymerization reaction, and the amount of surface active agent required to increase the heat exchange coefficient, U is more than about 3 ppm, for example, from about 3 to 15 ppm.

In an embodiment of the invention, the amount of surface active agent added to a polymer solution downstream of a reactor system and upstream of a heat exchanger system is sufficient to both increase the heat transfer coefficient U, of at least one heat exchanger and to quench the polymerization reaction.

Further details of the invention are illustrated by the following non-limiting example.

EXAMPLES

Figure 2:
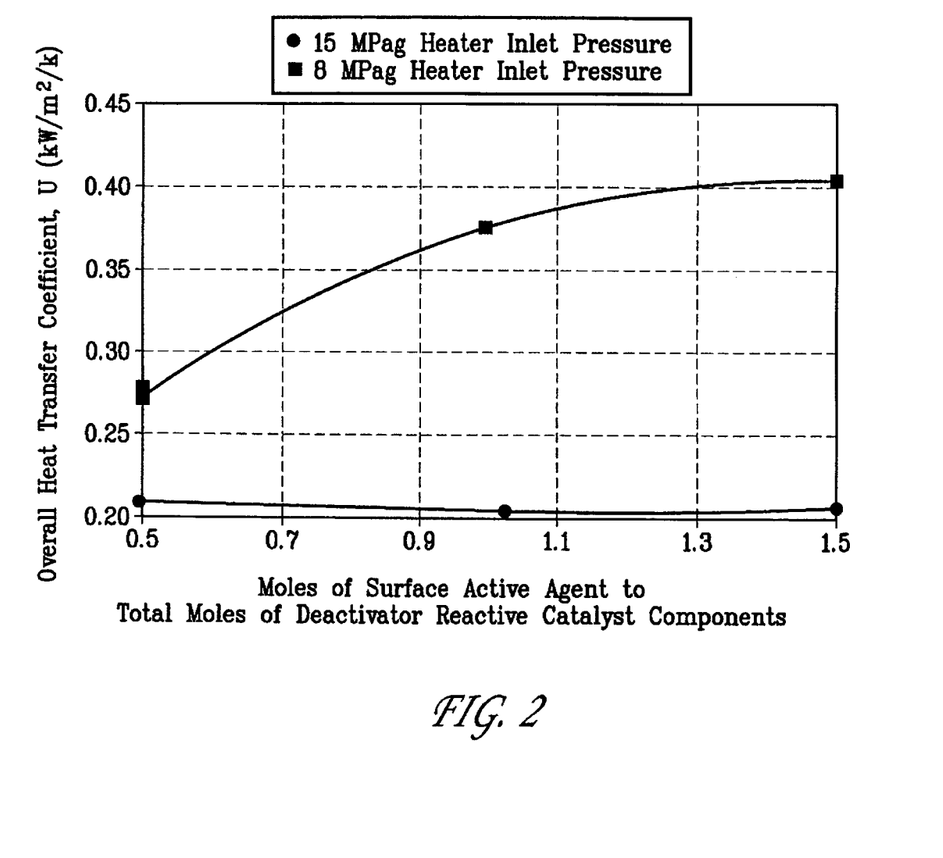
FIG. 2 shows the effect of a surface active agent on the heat transfer coefficient, U, of a heat exchanger that has a polymer solution flowing through it. The effect of added surface active agent on the heat transfer coefficient, U, is shown for a given polymer solution at two different pressures.

FIG. 2 displays the results of heat transfer experiments conducted at a pilot plant scale under two different pressure regimes in the presence of a surface active agent. In the experiments, a six-pass shell and tube heat exchanger was used to heat a reactor effluent polymer solution containing approximately 15 wt % polymer in a hydrocarbon solvent containing residual ethylene. The flow rate of polymer solution through the heat exchanger was approximately 750 kg/h. The surface active agent used was a mixture of carboxylic acids, mainly aliphatic carboxylic acids having from 6 to 9 carbons. The two curves in FIG. 2 represent data obtained for a given polymer solution at a pressure in which a single liquid phase polymer solution is present (15 MPag), and at a pressure under which phase separation has occurred (8 MPag) to provide a two phase liquid-liquid polymer solution (i.e. at 8 MPag the pressure is below the phase separation or cloud point pressure). The pressures in FIG. 2 correspond to the heat exchanger tube side inlet pressure, $P_{IN}$.

The data shows, that for a liquid-liquid, two phase polymer solution, increasing the amount of surface active agent, which is represented in FIG. 2 as an increase in the molar ratio of surface active agent to deactivator reactive catalyst components of from 0.5 to 1.5, results in an enhancement of the heat transfer coefficient, U, of from 0.27 kW/m$^2$/K to 0.4 kW/m$^2$/K, an increase of 48%. Increasing the amounts of surface active agent to levels beyond those shown on this plot did not result in any further significant enhancement in the heat transfer coefficient, U, demonstrating that the effect of the surface active agent on the heat transfer coefficient reaches a maximum (above a ratio of about 1.5).

For a single phase polymer solution (at 15 MPag, which is above the phase separation or cloud point pressure of the polymer solution) the concentration of the surface active agent had no effect on the heat transfer coefficient, U (the lower line in FIG. 2).

With reference to FIG. 2, the effect of the inventive process on the heat transfer coefficient, U, is fully reversible. If the addition of surface active agent is discontinued at a constant pressure of 8 MPag, then the U value returned to approximately its original value. Similarly, if at a constant level of surface active agent, the original operating pressure is restored to provide a single phase polymer solution (i.e. 15 Mpag), the U value is likewise restored (i.e. U decreased to approximately its original value). Thus it will be recognized by the person skilled in the art, that the surface active agent is not having a bulk effect, such as cleaning the heat exchange surface in a heat exchanger.

In these experiments, the surface active agent also acted as a catalyst deactivator, and a molar ratio of surface active agent to deactivator reactive catalyst components of about at least 0.3 was required to quench the polymerization reaction. The surface active agent consumed in the catalyst quenching reactions, did not increase the heat transfer coefficient, U.

The present invention, is not meant to be limited to any particular scale or process and is useful over a wide range of polymer solution flow rates through a heat exchanger system, including commercially relevant flow rates for a commercial scale LLDPE solution polymerization plant. By way of a non-limiting example, the flow rate of polymer solution through the heat exchanger system can be from about 300 kg/h to about 500,000 kg/h.

What is claimed is:

1. A high temperature solution polymerization process comprising:
    (a) polymerizing ethylene and optionally an alpha olefin in a solvent within a reactor system to produce a single phase polymer solution;
    (b) quenching the polymerization reaction downstream of the reactor system with a catalyst deactivator;
    (c) reducing the pressure of the single phase polymer solution downstream of the reactor system to a pressure which induces the single phase polymer solution to undergo liquid-liquid phase separation into a two phase polymer solution;
    (d) feeding the two phase polymer solution through a heat exchanger system comprising at least one heat exchanger, wherein the heat transfer coefficient U, of at least one heat exchanger is increased by adding at least one surface active agent to the polymer solution downstream of the reactor system and upstream of the heat exchanger system; and
    (e) feeding the polymer solution effluent from the heat exchanger system directly to a devolatilization system.

2. The process of claim 1, wherein the surface active agent is selected from the group consisting of carboxylate, sulfate, phosphate, phosphonate, and sulfonate compounds comprising from 6 to 30 carbon atoms.

3. The process of claim 1, wherein the surface active agent is a carboxylic acid comprising a linear or branched alkyl group comprising from 6 to 30 carbon atoms.

4. The process of claim 1, wherein the surface active agent is selected from a group consisting of pelargonic acid, nonanoic acid and mixtures thereof.

5. The process of claim 1, wherein the pressure is reduced by opening one or more pressure let down valves.

6. The process according to claim 1, wherein the surface active agent is added in amounts of from 1 to 1000 parts per million.

7. The process according to claim 1, wherein the surface active agent increases the heat transfer coefficient, U of at least one heat exchanger by at least 10%.

8. The process according to claim 1, wherein ethylene is copolymerized with 1-octene.

9. The process according to claim 1, wherein ethylene is present in at least 75 weight % based on the weight of ethylene and alpha olefins present in the reactor system.

10. The process according to claim 1, wherein ethylene is present in at least 85 weight % based on the weight of ethylene and alpha olefins present in the reactor system.

11. The process according to claim 1, wherein the heat exchanger system comprises one or more shell and tube heat exchangers.

12. The process according to claim 1, wherein the reactor system is a stirred tank reactor system.

13. The process of claim 1, wherein the reactor system comprises two stirred tank reactors arranged in series.

14. The process of claim 13, wherein a first reactor is operated at a lower temperature than a second reactor.

15. A high temperature solution polymerization process comprising:
    (a) polymerizing ethylene and optionally an alpha-olefin in a solvent within a reactor system to produce a single phase polymer solution;

(b) quenching the polymerization reaction downstream of the reactor system;

(c) reducing the pressure of the single phase polymer solution downstream of the reactor system to a pressure which induces the single phase polymer solution to undergo liquid-liquid phase separation into a two phase polymer solution;

(d) feeding the two phase polymer solution through a heat exchanger system comprising at least one heat exchanger, wherein the heat transfer coefficient U, of at least one heat exchanger is increased by adding at least one surface active agent to the polymer solution downstream of the reactor system and upstream of the heat exchanger system; and (e) feeding the polymer solution effluent from the heat exchanger system directly to a devolatilization system;

wherein the amount of surface active agent added to the polymer solution downstream of the reactor system and upstream of the heat exchanger system is sufficient to both increase the heat transfer coefficient U, of at least one heat exchanger, and to quench the polymerization reaction.

16. The process of claim 15, wherein the surface active agent is selected from the group consisting of carboxylate, sulfate, phosphate, phosphonate, and sulfonate compounds comprising from 6 to 30 carbon atoms.

17. The process of claim 15, wherein the surface active agent is a carboxylic acid comprising a linear or branched alkyl group comprising from 6 to 30 carbon atoms.

18. The process of claim 15, wherein the surface active agent is selected from a group consisting of pelargonic acid, nonanoic acid and mixtures thereof.

19. The process of claim 15, wherein the pressure is reduced by opening one or more pressure let down valves.

20. The process according to claim 15, wherein the surface active agent is added in amounts of from 1 to 1000 parts per million.

21. The process according to claim 15, wherein the surface active agent increases the heat transfer coefficient, U of at least one heat exchanger by at least 10%.

22. The process according to claim 15, wherein ethylene is copolymerized with 1-octene.

23. The process according to claim 15, wherein ethylene is present in at least 75 weight % based on the weight of ethylene and alpha olefins present in the reactor system.

24. The process according to claim 15, wherein ethylene is present in at least 85 weight % based on the weight of ethylene and alpha olefins present in the reactor system.

25. The process according to claim 15, wherein the heat exchanger system comprises one or more shell and tube heat exchangers.

26. The process according to claim 25, wherein the reactor system is a stirred tank reactor system.

27. The process of claim 15 wherein the reactor system comprises two stirred tank reactors arranged in series.

28. The process of claim 27 wherein a first reactor is operated at a lower temperature than a second reactor.

* * * * *